(12) United States Patent
Kostka

(10) Patent No.: US 7,416,057 B2  
(45) Date of Patent: Aug. 26, 2008

(54) METHOD AND APPARATUS FOR ENERGY-SAVING ELEVATOR CONTROL

(75) Inventor: Miroslav Kostka, Ballwil (CH)

(73) Assignee: Inventio AG, Hergiswil NW (CH)

( * ) Notice: Subject to any disclaimer, the term of this patent is extended or adjusted under 35 U.S.C. 154(b) by 632 days.

(21) Appl. No.: 11/022,960

(22) Filed: Dec. 27, 2004

(65) Prior Publication Data

US 2005/0263355 A1    Dec. 1, 2005

(30) Foreign Application Priority Data

Jun. 1, 2004    (EP) ................... 04405007

(51) Int. Cl.  
*B66B 1/18* (2006.01)

(52) U.S. Cl. .................... 187/382; 187/391

(58) Field of Classification Search .......... 187/293, 187/295, 296, 380–388, 391–396  
See application file for complete search history.

(56) References Cited

U.S. PATENT DOCUMENTS

| | | | |
|---|---|---|---|
| 3,891,064 A * | 6/1975 | Clark ..................... 187/295 |
| 4,402,387 A * | 9/1983 | Tsuji et al. .............. 187/293 |
| 5,679,932 A | 10/1997 | Kim | |
| 5,892,190 A | 4/1999 | Morita et al. | |
| 6,199,667 B1 * | 3/2001 | Fischgold et al. ........... 187/295 |
| 6,857,506 B1 * | 2/2005 | Tyni et al. .................. 187/282 |
| 7,032,715 B2 * | 4/2006 | Smith et al. ................. 187/380 |
| 7,083,027 B2 * | 8/2006 | Siikonen et al. ............. 187/383 |
| 7,275,623 B2 * | 10/2007 | Tyni et al. .................. 187/382 |

FOREIGN PATENT DOCUMENTS

| | | |
|---|---|---|
| EP | 0 246 395 | 11/1987 |
| EP | 0 662 443 | 7/1995 |
| GB | 2 111 244 | 6/1983 |

* cited by examiner

*Primary Examiner*—Jonathan Salata  
(74) *Attorney, Agent, or Firm*—Fraser Clemens Martin & Miller LLC; William J. Clemens

(57) ABSTRACT

A method of controlling an elevator installation with several elevators, in which destination call inputs of passengers are input by destination call input apparatus and in which at least one traffic criterion, which characterizes a traffic intensity, of the elevator installation is measured by an elevator control, wherein the elevator control allocates cost-optimizing elevators to the destination call inputs. In order to obtain an energy saving without prejudicing the transport capacity of the elevator installation, the elevator control additionally allocates energy-optimizing elevators to the destination call inputs in dependence on the traffic criterion.

14 Claims, 3 Drawing Sheets

METHOD AND APPARATUS FOR ENERGY-SAVING ELEVATOR CONTROL

BACKGROUND OF THE INVENTION

The present invention relates to a method of controlling an elevator installation with several elevators. The passengers input their travel wishes in the form of destination call inputs by way of a destination call input apparatus. An elevator control measures at least one traffic criterion, which characterizes a traffic intensity, of the elevator installation, wherein the elevator control allocates the elevators in an energy-optimizing manner to the destination call inputs of passengers. The present invention further relates to an elevator installation for carrying out the above-mentioned method.

Modern elevator installations operate in a manner controlled by destination calls. A passenger inputs his or her travel destination by way of a destination call input apparatus so that an elevator control can select an elevator from several elevators for corresponding destination call inputs in a cost-optimizing manner and allocate it to this passenger. The cost optimization is in that case influenced by the optimization criteria of waiting time, travel time to the destination location or maximum transport performance.

In modern elevator installations low energy consumption is frequently extolled, wherein, however, savings are achieved in the region of drive technology or mechanics of the elevator installations and not through the form of elevator control or form of allocation of the passengers. This is partly due to the fact that the demands on elevator installations on the one hand to make available a maximum transport performance and on the other hand to operate in an energy-saving manner are in part mutually contradictory. In that case there is to be understood by transport performance primarily that the operator of the elevator installation expects a required filling of a building in specific times and maintenance of the average waiting times predetermined for the elevator installation.

A group control for elevators is described in European patent document EP 0 246 395 A1. According to this patent specification, elevators of the elevator installation are allocated in a cost-optimizing manner to the destination calls input by passengers so that minimum waiting times result and transport performance is increased. In that case a complicated control circuit which undertakes this above-described cost optimization is used.

SUMMARY OF THE INVENTION

Against this background the object results of indicating a method for control of an elevator installation in which the possibilities for energy savings are utilized by suitable measures without other requirements with respect to the requisite transport performance and the waiting times to be maintained being prejudiced.

This object is met in the case of a method according to category for control of an elevator installation in that elevators are allocated to the destination call inputs by the elevator control in an energy-optimizing manner in dependence on the traffic criterion.

For that purpose the elevator control constantly measures the traffic intensity in the form of at least one traffic criterion, wherein the elevator control switches over from the cost-optimizing destination call allocation to the energy-saving allocation depending on the traffic intensity. The energy-saving allocation is also termed energy-saving mode in the following.

The present invention is based on the idea that elevator installations for most of the time are not operated at their transport capacity limit. Due to the algorithms, which are required for the predetermined transport capacity, for cost optimization most elevator installations are, however, operated constantly and continuously in a cost-optimizing manner, wherein the cost optimization is largely used in the allocation of newly input destination calls.

The proposed solution maintains the requisite transport capacity and the average waiting times for the destination call allocations, but utilizes the free periods present outside traffic peak times. Within these free periods the constant efforts of the elevator control to achieve minimum waiting times and a maximum transport capacity are deactivated. In that case, through the energy-saving allocation of the destination call inputs in accordance with the present invention only a moderate prolonging of waiting times has to be taken into account, which in general is not perceptible by the passengers.

The energy-saving measures in the allocation of destination calls are particularly effective in the case of elevators which have to overcome large distances without disembarkation floors. In large buildings it is increasingly observable that almost empty elevator cars travel over so-called blind zones of possibly 100 meters length. In that case the waiting time at the floor for the possibly only single passenger amounts in the extreme case to only a few seconds and that in a large building where the acceptance of correspondingly longer waiting times is inevitably present. The present invention is used in this situation.

In one advantageous refinement of the present invention the energy-optimizing allocation is activated in the case of falling below of at least one traffic criterion. In that case, the falling below of a traffic criterion is monitored for a predeterminable time period. On exceeding a fixable number of traffic criteria the energy-optimizing allocation is deactivated. Here, too, an exceeding should advantageously be evaluated, only after a predetermined time period, as exceeding of a traffic criterion. The time period in which the traffic criteria are monitored can in that case be formed to be specific to the elevator. Depending on the respective case of use the energy-optimizing allocation can also be deactivated in the case of exceeding a traffic criterion and activated in the case of falling below the criterion.

Belonging to the traffic intensity as a first traffic criterion in one example of embodiment of the present invention is determination of a mean waiting time of the passengers until transport, wherein this mean waiting time of the passengers until transport is compared with a predetermined waiting time for the energy-saving allocation. The elevator installation is then switched by the elevator control, when the predetermined waiting time for the energy-saving allocation is fallen below, to the energy-saving mode characterized by the energy-saving allocation.

A second traffic criterion for activation of the energy-saving mode is formed by a comparison of a number of the passengers, who are waiting at all floors and up to now have not yet been transported, with a number of waiting passengers for the energy-saving mode. Here, too, the elevator installation is then switched by the elevator control, when the predetermined number of waiting passengers is fallen below, to the energy-saving mode.

In a further advantageous refinement of the present invention a third traffic criterion for activation of the energy-saving mode is formed by means of a comparison of a mean number of passengers per journey with a number of passengers per journey for the energy-saving mode. The elevator installation is switched by the elevator control, when the predetermined number of passengers per journey is fallen below, to the energy-saving mode. In that case, for example, thirty seconds of standstill of an elevator can be detected as empty travel in the detection of traffic intensity.

In the case of a preferred example of embodiment of the present invention a deactivation of the energy-saving allocation is carried out in dependence on a predeterminable time. A rapid switching back and forth between the different forms of allocation is thereby avoided, which would ultimately increase the waiting time for passengers and thus be counterproductive. The predetermined time can then be a minimum running time for the energy-saving allocation. Moreover, it is possible to activate and deactivate the energy-saving mode on a daily basis at clock times remaining the same, wherein this fixed activation and deactivation can also be varied appropriately to need.

In a further advantageous refinement of the present invention the above-mentioned traffic criteria are measured within a settable time interval or a settable short history. It is thereby possible to influence the sensitivity in the case of switching over from the costs-optimizing mode to the energy-saving mode. An example of a settable time interval in which the traffic criteria or overall the traffic intensity are measured lies at five minutes. This settable time interval can be different depending on the building.

If at least one or also several of the traffic criteria mentioned above by way of example are fulfilled there is switching over in the elevator installation, particularly the elevator control, to the energy-saving allocation so that newly input destination calls are allocated to the elevators in an energy-saving manner.

In an advantageous refinement of the present invention a deactivation of the energy-saving mode is undertaken only when two of the mentioned traffic criteria are no longer fulfilled and a settable minimum running time for the energy-saving measures has elapsed.

If the energy-saving mode is switched on and new destination calls are allocated in the energy-saving manner, energy can thereby be saved in particular in that the elevator cars are moved in a balanced manner. Thus, in principle in the energy-saving allocation it is sought to so allocate the destination calls to the elevators that the elevators are moved in a balanced manner. A so-called start/destination coincidence of a newly input destination call with an already registered destination call forms an exception in this balancing of the elevators. By a start/destination coincidence in the sense of the present invention there is understood travel together of at least two passengers. For this purpose in a further advantageous refinement of the present invention in the case of a new input of a destination call a start/destination coincidence of the new destination call input with other already registered destination call inputs is checked, wherein in the case of the presence of a start/destination coincidence the new destination call input is allocated in a cost-optimizing manner even though the energy-saving allocation is activate by reason of the measured traffic criteria. If during the validity of the energy-saving mode a new destination call is input and a start/destination coincidence is present, one to two journeys of the elevator is or are saved relative to an energy-saving allocation to an elevator which would possibly be better balanced by the allocated passenger, but would have no coincidence of the destination calls. However, compensation for the energy consumption of the two additional journeys cannot be provided by the better balancing, so that in this case the allocation is undertaken in the cost-optimizing manner notwithstanding the activated energy-saving mode.

In an advantageous refinement of the present invention there is undertaken before each start of travel of an elevator a load measurement by means of which, and possibly on the basis of further reservations for passengers allocated to this elevator, a course of a elevator load over a determined travel path of the elevator is determined. This course of the elevator load serves the purpose of selecting, in the case of energy-saving allocation of elevators, the elevator with which an allocation of a new destination call ensures better balancing.

In a further advantageous refinement of the present invention in the case of activated energy-saving mode and a new input of a destination call the elevator load of an elevator is checked for the travel path corresponding with the destination call and the destination call is allocated to the elevator for which boarding of the passenger of this destination call does not cause exceeding of a predetermined elevator load for this travel path. It is thereby achieved that the elevators are allocated preferentially in which the elevator load lies below a predetermined limit for the travel path relevant to this destination call.

In an advantageous refinement of the present invention the predetermined elevator load corresponds with half the permissible elevator load less a predetermined passenger weight. In that case the passenger weights can be different according to the respective place of use and in dependence on the region.

In an advantageous refinement of the present invention a theoretical waiting time of each passenger is ascertained when the energy-saving mode is activated. In addition, a settable, tolerable waiting time per elevator is established and serves for the elevator control as a regulating magnitude. The theoretical waiting time of each individual passenger already allocated then results from the instantaneous time less the input time. Additionally added to this theoretical waiting time is the theoretical time for reaching the starting or boarding floor with consideration of possibly planned intermediate stops.

In the case of the energy-saving allocation of an elevator this tolerable waiting time is compared with a theoretical waiting time of all destination calls allocated to this elevator, wherein a destination call could then be allocated to an elevator when the above-mentioned theoretical waiting time of all destination calls allocated to this elevator is less than the tolerable waiting time. It is thereby guaranteed that the waiting time does not lie above an established tolerable waiting time notwithstanding the energy-saving allocation. This tolerable waiting time should in that case in principle not lie above the guaranteed waiting time required by the operator. In that case, however, it is prevented that in the case of cost-optimizing allocation the waiting times are progressively shortened without attention to the consumed energy.

In a further advantageous refinement of the present invention there is used as a further criterion in the energy-saving allocation of destination calls the comparison of a settable, tolerable travel time to the destination with the theoretical travel time to the destination of each passenger. The travel time to the destination results from the waiting time and the travel time inclusive of the planned intermediate stops of the elevator.

The allocation of a new destination call could be undertaken when the travel time to the destination of all passengers allocated to this elevator is less than the tolerable travel time to the destination. The tolerable travel time to the destination is in that case again a settable magnitude which is established per elevator and which is used by the elevator control as a regulating magnitude.

It is advantageous if during the activated energy-saving mode in the case of allocation of new destination calls the otherwise usual limitation of the number of intermediate stops, which is usual with the cost-optimizing allocation, is cancelled. This number of intermediate stops is indirectly influenced by the monitoring of the tolerable waiting time and the tolerable travel time to the destination. Limitation of the number of intermediate stops normally serves for shortening the round trip times in the cost-optimizing allocation of destination calls.

In an advantageous refinement of the present invention when the energy-saving mode is activated and with new input of a destination call this destination call is allocated to the elevator which has the longest common travel path with suitable elevator load. The suitable elevator load was described above. In order to be able to make a statement with respect thereto the common travel paths by the destination call to be allocated and the instantaneously checked elevator have to be compared. This advantageous allocation of the elevator which has the longest common travel path with suitable travel load reduces, inter alia, the number of intermediate stops.

In an advantageous refinement of the present invention during the energy-saving mode and the allocation of the new destination calls, when there is suitability of several elevators for this destination call with the same common travel path the elevator most favorable in costs is allocated.

It is advantageous with the refinement according to the present invention that notwithstanding the activated energy-saving mode in the allocation of newly input destination calls an elevator could be allocated only when the criteria for energy-saving allocation of elevators is not fulfilled, wherein an elevator is allocated to a destination call of that kind in accordance with a cost-optimizing allocation without consideration of the energy-saving allocation.

The above-mentioned object is also fulfilled by an elevator installation with several elevators which are arranged in a building for the transport of persons, in which destination calls of passengers can be input by way of destination call input apparatus and in which at least one traffic criterion can be measured by an elevator control within a predeterminable time period, wherein an elevator can be allocated in a cost-optimizing manner to a passenger by the elevator control and can be indicated by way of an information unit and the elevators can additionally be allocated in an energy-optimizing manner to the passengers in dependence on the at least one traffic criterion.

In an advantageous refinement of the present invention the elevator control undertakes measuring of the traffic intensity within a settable time period, wherein the elevator installation can be switched by the elevator control to the energy-saving mode in dependence on the measured traffic intensity.

Overall, through the refinement according to the present invention not only of the method, but also of the elevator installation, a collection of passengers with an elevator is favored in a direction of attainment of a balanced load, wherein the better balanced elevator uses less energy than an unbalanced elevator. The probability increases for the refinement according to the present invention that in the better balanced elevator certain travel paths for two or more passengers together can be covered.

Through the allocation of several journeys to an elevator, journeys of other elevators are automatically avoided, whereby several empty journeys (collection journeys) are avoided and further energy savings can be achieved.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
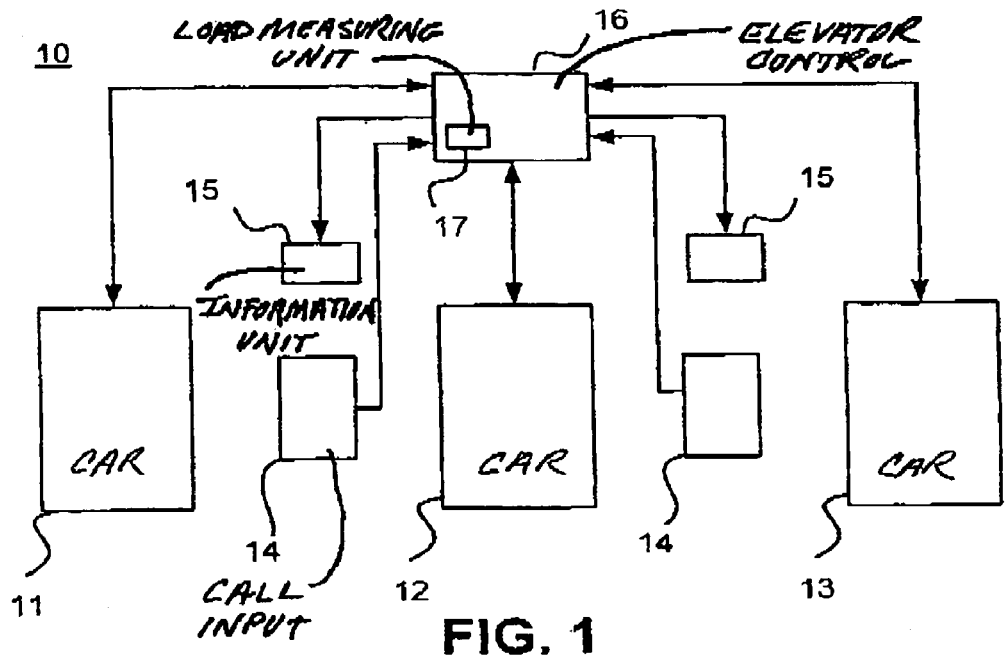
FIG. 1 is a block diagram of an elevator installation according to the present invention.

An elevator installation 10 according to the present invention is shown in FIG. 1. The elevator installation 10 according to the present invention comprises three elevators 11, 12 and 13. The three elevators 11, 12 and 13 are controlled by an elevator control 16. For simplification of the illustration, depiction of drive units and elevator shafts has been dispensed with. A respective destination call is input by the passengers by way of destination call input apparatus 14 and transmitted to the elevator control 16. The elevator control 16 ascertains the elevator 11, 12, 13 most favorable for this destination call and communicates to the passenger the ascertained elevator 11, 12 or 13 by way of the information unit 15. Moreover, a load measuring unit 17 by means of which a load measurement of the individual elevators can be undertaken is arranged in the elevator control 16, wherein the load-receiving parts of the load-measuring unit 17 are arranged at the elevators 11, 12, 13 (not illustrated). In that case, the form of allocation of the elevators is determined in the elevator control 16.

Figure 2:
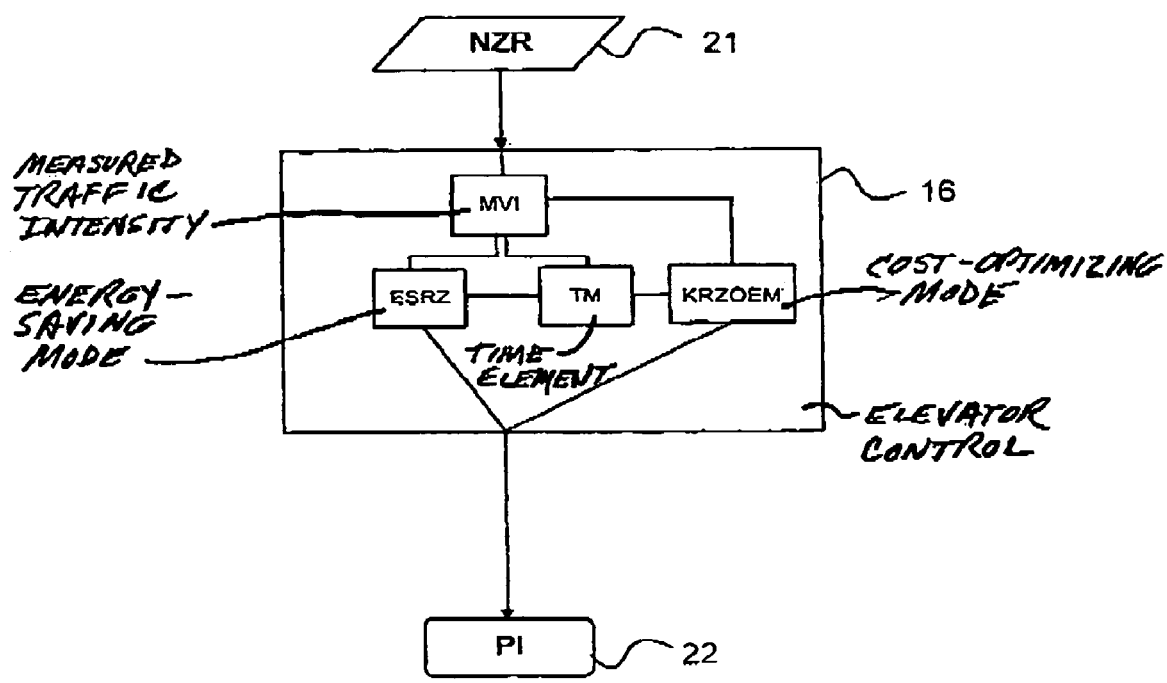
FIG. 2 is a flow chart for allocation of a new destination call in accordance with the present invention.

FIG. 2 shows a sequence control for allocation of a new destination call. The new destination call is input and processed by the elevator control 16. In a step 21 a new destination call NZR is input by the passenger by way of the destination call input apparatus 14. The elevator control 16 constantly undertakes measurement of the traffic intensity MVI, wherein the traffic intensity comprises one or more fixable traffic criteria 32, 33, 34 (shown in FIG. 3). In the case of falling below one or more of the predetermined traffic criteria the elevator installation 10 is switched by the elevator control 16 to the energy-saving mode ESRZ. In the energy-saving mode new destination calls are allocated in an energy-saving manner ESRZ by the elevator control 16. A time element TM, which is used in the case of deactivation of the energy-saving mode ESRZ, is arranged in the elevator installation 16. After the energy-saving mode ESZR has been activated, one or more traffic criteria can no longer fulfil the predetermined values, so that the conditions for activation of the energy-saving mode ESZR are no longer given. However, the time element TM is used in order to avoid frequent switching back and forth. The time element TM is started when the energy-saving mode ESRZ is activated. The element contains a predeterminable time period, for example five minutes, the expiry of which is checked. The energy-saving mode ESRZ is deactivated only when one or more of the traffic criteria 32, 33, 34 are no longer fulfilled and the predetermined time period of the time element TM has expired. After this time period has expired, new destination calls are allocated again in the costs-optimizing manner (KRZOEM) without energy-saving measures. The elevator control 16 thus activates the allocation mode (ESZR or KRZOEM) for new destination calls in dependence on the measured traffic intensity MVI. The elevator which is to be selected and which is ascertained by the elevator control 16 for the input destination call is indicated PI to the passenger by way of the information unit 15 in a step 22 independently of the form of allocation.

Figure 3:
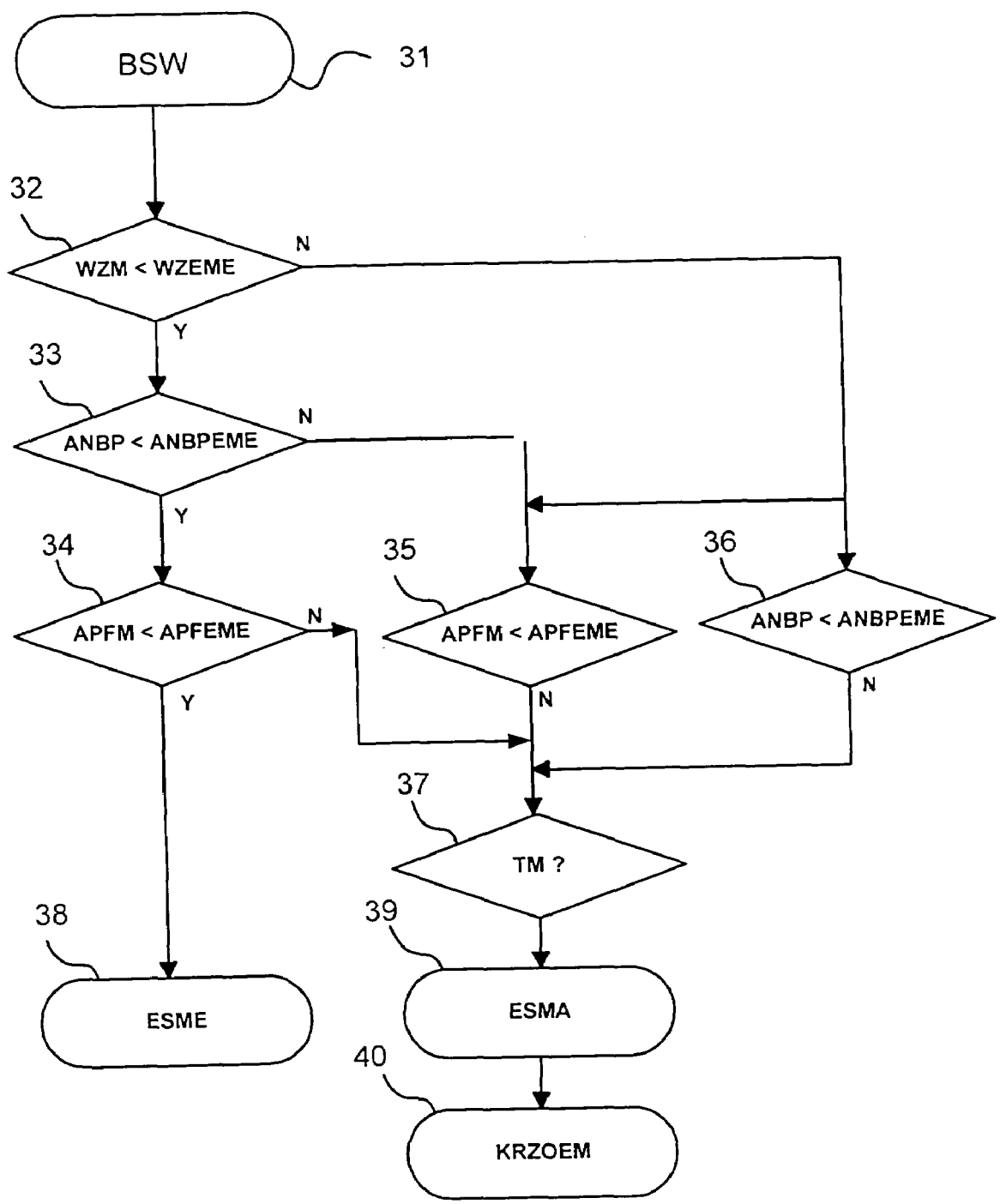
FIG. 3 is a flow chart for activation of an energy-saving mode in accordance with the present invention.

In FIG. 3 it is illustrated in detail how the measured traffic intensity with the traffic criteria 32, 33, 34, by way of example, is used for activation of the energy-saving or cost-optimizing mode of allocation. In the step 31 statistical values from the transmitted destination calls, the load measurements and other relevant parameters of the elevator control, for example instantaneous clock time, time period of monitoring, elevator load and passenger weight, are calculated or ascertained. These statistical values also comprise a mean waiting time WZM, a number of passengers ANBP not served and a number of passengers APFM per journey.

In the step 32 the mean waiting time WZM is compared with a predetermined waiting time WZEME for the energy-saving mode. If the mean waiting time WZM is less than the mean waiting time WZEME for the energy-saving mode, there is continuation with the step 33 in which the number of passengers ANBP not served is compared with a fixed number of passengers ANBPEME, which are not served, for the energy-saving mode. If this comparison is positive, there follows a next step 34 in which the number of passengers APFM per journey is compared with a number of passengers APFEME per journey for the energy-saving mode. If also this comparison is positive the elevator installation 10 is shifted by the elevator control 16 in a step 38 to an energy-saving mode ESME, in which new destination calls are allocated in an energy-saving manner and the time element TM in the elevator control 16 is activated.

If in the step 32 on comparison of the mean waiting time WZM with the mean waiting time WZEME for the energy-saving mode a negative result is calculated, the further procedure is with steps 35 and 36. In the step 35 the number of passengers APFM per journey is compared with the number of passengers APFEME per journey for the energy-saving mode. In the step 36 the number of passengers ANBP not served is compared with the number of passengers ANBPEME, which are not served, for the energy-saving mode. If also these traffic criteria of the steps 35 and 36 are not fulfilled, run-down of the previously started time element TM in a step 37 is checked. If the time period of the time element TM has expired, the energy-saving mode ESMA is deactivated in a step 39 so that the allocation of new destination calls in the cost-optimizing manner KRZOEM without the energy-saving measures takes place. If also a comparison in the step 33 is negative, further procedure is with the step 35 in which the number APFM of persons per journey is compared with the number of persons APFEME per journey for the energy-saving mode. If also this comparison in the step 35 is negative, the time element TM is similarly checked or, in a given case, the energy-saving mode ESMA of the elevator installation deactivated and new destination calls allocated in the cost-optimizing manner KRZOEM.

Figure 4:
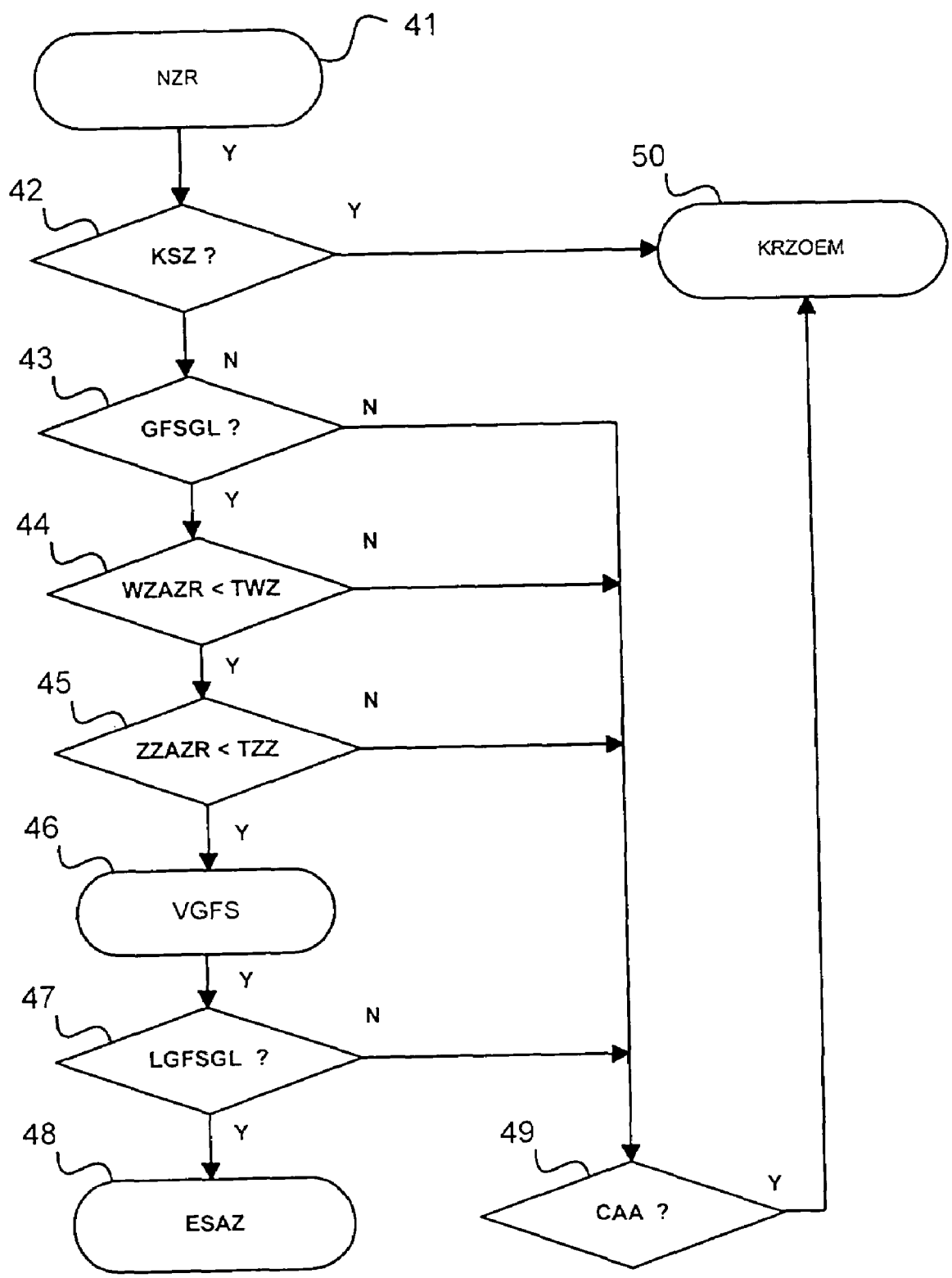
FIG. 4 is a flow chart of an energy-saving allocation of destination calls in accordance with the present invention.

In FIG. 4 is a flow chart in which it is illustrated how a newly input destination call is allocated in an energy-saving manner in the case of an activated energy-saving mode.

In a step 41 a new destination call NZR is input. Firstly, in a step 42 a start/destination coincidence between the newly input destination call and already registered destination calls is checked. If this investigation is positive, the newly input destination call is allocated not in the energy-saving manner, but in the costs-optimizing manner KRZOEM in a step 50. As explained above, through utilization of a coincidence one to two journeys of elevators are saved, so that a very large amount of energy can thereby be saved. This saved energy cannot be achieved by a better balancing of the elevators, so that, in the case of a coincidence the allocation of the coincident destination call is carried out in the costs-optimizing manner notwithstanding the activated energy-saving mode.

If a coincidence is not present, a common travel path GFSGL with suitable load is checked in a step 43. For that purpose, the load is measured by the elevator control 16 by means of the load measuring unit 17 before each travel start of an elevator. Thus, in the case of allocation of a new destination call to an elevator the common travel path GFSGL with suitable load can be taken into consideration, in which the elevator load is taken into account. The preferred elevator load for provision of a balanced elevator installation lies at half the maximum permissible elevator load "Q/2". If in the case of the checking in a step 43 for a common travel path of the newly input destination call there is present for this travel path a load of a checked elevator which is smaller than half the permissible elevator load (Q/2) less a predetermined passenger weight of, for example, eighty kilograms, the further procedure is with a step 44. If the common travel path GFSGL with suitable load has not been found in the case of this check in the step 43, a next elevator CAA is checked in a step 49 with respect to the common travel path GFSGL with suitable load. If in this check in the step 49 no other elevator was found, a elevator is allocated in the costs-optimizing manner to this destination call in the step 50. If, however, a common travel path GFSGL with suitable load is present in the case of the comparison in the step 43, next in the step 44 the waiting time of all destination calls WZAZR allocated to this elevator is compared with a tolerable waiting TWZ. In the case of a positive comparison further procedure is with a step 45. In the case of a negative comparison result, another elevator is correspondingly checked in the step 49, and in a given case an elevator is allocated in the cost-optimizing manner to this destination call in the step 50.

In the case of a positive comparative result in the step 44 further procedure is with the step 45, in which a travel time ZZAZR to the destination of all allocated calls is compared with a tolerable travel time TZZ to the destination. Here, in the case of a negative comparison a next elevator is similarly checked in the step 49 and, in a given case, when there is no discovery of a suitable elevator an elevator is allocated in the cost-optimizing manner to this destination call in the step 50. If, however, this comparison should be positive, further procedure is with a step 46. In the step 46 the comparison of the common travel path VGFS is undertaken. In a step 47, which follows thereupon, the elevator is selected which has the longest common travel path LGFSGL with suitable load. If this comparison should be negative, a further elevator is selected in the step 49 and, in a given case, an elevator is allocated in the cost-optimizing manner in the step 50. If the comparison in the step 47 is positive, the new destination call is allocated to the elevator which has the longest common travel path LGFSGL with suitable load. This now-selected elevator is allocated in an energy-saving manner and is communicated to the passenger, who has input the destination call, by way of the information unit 15.

Thus, in the case of activated energy-saving allocation initially there is checking for coincidence and thereafter for an appropriate better balancing of the elevator. From the elevators which fulfil the above-mentioned criterion those are selected for which the allocation of the new boarding passengers would not cause, for any of the previously already allocated destination calls, a longer waiting time "WZ" than the tolerable waiting time TWZ and a longer journey time "FZ" to the destination than the tolerable journey time TZZ to the destination. From the elevators which fulfil both conditions that elevator is selected which has the longest travel path LGFSGL—which was already planned in advance—in common with the new destination call. If several elevators should have the same common paths with the new destination call, the elevator which is most favorable in terms of costs is selected and the new destination call is allocated thereto. If after the above-mentioned checks no elevator should be found which fulfils all conditions, the new destination call is allocated according to the cost-optimizing criteria without energy-saving measures.

There is thus indicated a method of controlling an elevator installation in which in time periods in which the loading of the elevator installation is not particularly high, energy-saving measures are initiated without the transport capacity of the elevator installation being prejudiced, since the method in the case of a rise in the traffic intensity registers this rise and can activate a cost-optimizing allocation of elevators which serves for maximizing transport capacity and maintenance of guaranteed waiting times.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of controlling an elevator installation with a plurality of elevators including input of destination call inputs of passengers by a destination call input apparatus, wherein at least one traffic criterion, which characterizes a traffic intensity, of the elevator installation is measured by an elevator control, and wherein the elevator control allocates the elevators in a cost-optimizing manner to the destination call inputs, comprising the steps of:
   a. comparing an actual value of at least one traffic criterion with an energy-saving value; and
   b. operating the elevator control to allocate a destination call input in an energy-optimizing manner to one of the elevators in dependence on the result of the comparison wherein the elevator control switches from the cost-optimizing allocation to the energy-optimizing allocation depending upon the traffic intensity.

2. The method according to claim 1 wherein when the actual value falls below the energy-saving value, the energy-optimizing allocation is activated and when actual values of a predetermined number of traffic criteria exceed corresponding energy-saving values, the energy-optimizing allocation is deactivated.

3. The method according to claim 1 wherein the energy-optimizing allocation is activated when at least one of the following occurs:
   a mean waiting time (WZM) of the passengers at the floor until served is below a predetermined waiting time (WZEME) for the energy-optimizing allocation;
   a number of the passengers (ANBP) waiting at floors, but not yet served, lies below a predetermined number of waiting passengers (ANBPEME) for the energy-optimizing allocation; and
   a mean number of passengers (APFM) per journey lies below a number of passengers (APFEME) per journey for the energy-optimizing allocation.

4. The method according to claim 1 wherein the energy-optimizing allocation is deactivated in dependence on a predetermined time (TM).

5. The method according to claim 1 wherein in response to a new input of a destination call, a start/destination coincidence of the new destination call input is checked with other already registered destination call inputs and in the presence of a start/destination coincidence the new destination call input is allocated in the cost-optimizing manner.

6. The method according to claim 1 wherein before each start of travel of each of the elevators there is undertaken a load measurement by which a course of an elevator load of the passengers allocated to each of the elevators is ascertained over an associated determined travel path, and in the case of an energy-optimizing allocation of a destination call input the elevator load of each of the elevators is checked for the travel path corresponding with the destination call input and the destination call input is allocated to a one of the elevators in which the boarding of the passenger associated with the destination call does not cause exceeding a predetermined elevator load for the travel path (GFSGL), wherein the predetermined elevator load ($Q/2-G_P$) corresponds with a half of a permissible elevator load ($Q/2$) less a predetermined passenger weight ($G_P$).

7. The method according to claim 1 wherein during the energy-optimizing allocation a theoretical waiting time (WZ) of each passenger to whom one of the elevator cars is already allocated is recalculated from a theoretical travel time of the one elevator until reaching a boarding floor with consideration of a new passenger to be allocated and a delay possibly caused by the allocation and the theoretical waiting time is compared with a settable, tolerable waiting time (TWZ) and all of the elevators with the theoretical waiting time smaller than the tolerable waiting time are considered for the new allocation.

8. The method according to claim 7 wherein during the energy-optimizing allocation the destination call input is allocated to a one of the elevators having a longest common travel path (LGFSGL) with a suitable elevator load, wherein in a case of suitability of at least two of the elevators with common travel paths a one of the suitable elevators most favorable in costs is allocated.

9. The method according to claim 1 wherein during the energy-optimizing allocation a theoretical time of each passenger to a destination (ZZ) associated with the destination call, which theoretical time results from a waiting time (WZ) and a travel time (FZ) inclusive of planned intermediate stops of the elevators, is compared with a settable, tolerable time (TZZ) to the destination and for a new input of a destination call those elevators are considered for allocation for which a travel time (ZZAZR) to the destination of all passengers allocated to the elevators is smaller than the tolerable travel time.

10. The method according to claim 9 wherein during the energy-optimizing allocation the destination call input is allocated to a one of the elevators having a longest common travel path (LGFSGL) with a suitable elevator load, wherein in a case of suitability of at least two of the elevators with common travel paths a one of the suitable elevators most favorable in costs is allocated.

11. The method according to claim 1 wherein during the energy-optimizing allocation of new destination call inputs a preset limitation of a number of intermediate stops is cancelled.

12. An elevator installation including a plurality of elevators arranged in a building for transport of persons, wherein destination calls of passengers are input by a destination call input apparatus and at least one traffic criterion is measurable within a predeterminable time period by an elevator control, the elevator control allocating the elevators in a cost-optimizing manner with the allocation to a passenger indicated by an information unit, comprising:
   means in the elevator control for monitoring the at least one traffic criterion; and means in the elevator control for allocating the elevators in an energy-optimizing manner in dependence upon a value of the at least one traffic criterion wherein the elevator control switches from the cost-optimizing allocation to the energy-optimizing allocation depending upon the traffic intensity.

13. The elevator installation according to claim 12 wherein the elevator control includes means for deactivating said means for allocating in an energy-optimizing manner in dependence on a predetermined time (TM).

14. The elevator installation according to claim 13 wherein said means for deactivating includes a time element set for the predetermined time.

* * * * *